UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MEDICINAL PREPARATION.

1,081,592. Specification of Letters Patent. Patented Dec. 16, 1913.

No Drawing. Application filed August 6, 1912. Serial No. 713,509.

*To all whom it may concern:*

Be it known that we, PAUL EHRLICH, M. D., professor of medicine, and ALFRED BERTHEIM, Ph. D., citizens of the Empire of Germany, and residing at Frankfort-on-the-Main, Germany, have invented certain new Medicinal Preparations, of which the following is a specification.

This invention relates to preparations of products made as described in Letters Patent of the United States No. 986,148, dated March 7, 1911, which products may be generically designated as arseno benzenes and contain the generic nucleus:

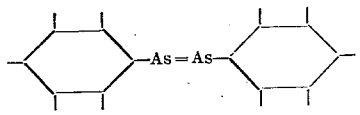

The amino-oxy derivatives of arseno-benzene, and especially the 3-3'-diamino-4-4'-dioxy-arseno-benzene have been found to be valuable products for therapeutical purposes and particularly for the treatment of syphilis and other infectious diseases. The free bases are generally insoluble or difficultly soluble in water, but readily soluble in dilute hydrochloric acid forming hydrochlorids, and in the form of their hydrochlorids they are easily soluble in water. The solubility of the hydrochlorids or dihydrochlorids of these products renders them especially valuable for the formation of solutions or suspensions for injection intravenously, etc. These hydrochlorids, however, and in particular the dihydrochlorids of the 3-3'-diamino-4-4'-dioxyarseno-benzene, have been found to be easily oxidizable, even on mere contact with air, oxidation products being thus formed of a decidedly toxic nature which renders the use of such oxidized products dangerous and very painful. The present invention intends to prevent such oxidation, and to keep the products pure and free from toxic oxidation products. Such protection and prevention of oxidation is accomplished by placing the above-mentioned hydrochlorids or dihydrochlorids in an ampul capable of being hermetically sealed, and filled with a non-oxidizing gas such as nitrogen, carbonic acid, or hydrogen, and then hermetically sealing the ampul so that in the presence of an inert and non-oxidizing gas its contents are kept from the atmosphere. In practice it has been found advantageous to use a glass tube about half an inch in diameter and about two inches long, and to draw the tube out to a point and seal the point after the contents have been inserted and the tube has been filled with an inert gas. The dihydrochlorid of the 3-3'-4-4' diamino-dioxyarseno-benzene thus protected has been found to remain in a pure and uncontaminated condition, which insures its reliability as a medicinal agent. In the case of these powerful arsenic-containing remedies which are used in relatively large amounts for purposes of hypodermic injection (the average dose varies from 0.3 to 0.5 gram of the dihydrochlorid of the 3-3'-4-4'-diamino-dioxyarseno-benzene, and if injected in the form of an alkaline solution, the solution may amount to as much as 200 cc.) it is not only necessary that the formation of toxic by-products be avoided during the manufacture, but it is also necessary that the pure products once formed be kept in a pure and uncontaminated condition until they are used. The novel ampul of the present invention provides conditions for maintaining the purity of the above described products.

The term "aminooxyarsenobenzene" as used herein is to be understood as generically including such derivatives as are described in United States Patent No. 1,053,300, dated February 18, 1913.

What we claim and desire to secure by Letters Patent of the United States is:—

1. An ampul hermetically sealed containing aminooxyarsenobenzenes in an atmosphere of a non-oxidizing gas.

2. An ampul hermetically sealed containing polyaminodioxyarsenobenzene in an atmosphere of a non-oxidizing gas.

3. An ampul hermetically sealed containing diaminodioxyarsenobenzene in an atmosphere of a non-oxidizing gas.

4. An ampul hermetically sealed containing a hydrochlorid of an aminooxyarsenobenzene in an atmosphere of a non-oxidizing gas.

5. An ampul hermetically sealed containing a hydrochlorid of a polyaminodioxy-arsenobenzene in an atmosphere of a non-oxidizing gas.

6. An ampul hermetically sealed containing a hydrochlorid of a diaminodioxy-arsenobenzene in an atmosphere of a non-oxidizing gas.

7. An ampul hermetically sealed containing the dihydrochlorid of the 3-3'-4-4'-diaminodioxy-arseno-benzene in an atmosphere of a non-oxidizing gas.

8. The herein described method of conserving aminooxyarsenobenzenes, which consists in confining the same in an atmosphere of a non-oxidizing gas.

In testimony whereof we have hereunto signed our names in the presence of two subscribing witnesses.

PAUL EHRLICH.
ALFRED BERTHEIM.

Witnesses:
ELSE MEBUS,
CARL GRUND.